United States Patent Office 3,128,267
Patented Apr. 7, 1964

3,128,267
DISAZO DYESTUFFS AND THEIR METAL
COMPLEX COMPOUNDS
Peter Schmitz, Cologne-Stammheim, Heinrich Morschel, Leverkusen, and Karlfried Wedemeyer, Cologne-Stammheim, Germany, assignors to Farbenfabriken Bayer Aktiengesellschaft, Leverkusen, Germany, a corporation of Germany
No Drawing. Filed Mar. 22, 1960, Ser. No. 16,648
Claims priority, application Germany Mar. 25, 1959
2 Claims. (Cl. 260—148)

The present invention relates to new and valuable disazo dyestuffs and to their metal complexes; more particularly it relates to disazo dyestuffs of the following formula

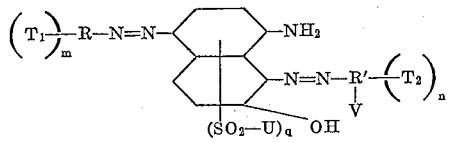

In this formula R and R' represent radicals of aromatic diazo components, V denotes a metal complex-forming grouping in the o-position to the azo bridge, U stands for —OH or the radical

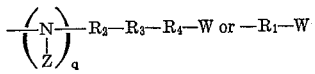

$m$ and $n$ stand for numbers 0 to 3, whereby $m+n$ must be at least 1, $q$ is 0 or 1, and $T_1$ and $T_2$ stand for groupings of the formula $$-SO_2-R_1-W \text{ or } -R_2-R_3-R_4-W$$

wherein $R_1$ denotes a bridge member with 2 or 3 carbon atoms between —$SO_2$— and —W, $R_2$ represents an alkylene or cycloalkylene radical which may be linked to R or R' directly or via a bridge member, $R_4$ represents an alkylene radical with up to 3 carbon atoms between the radicals —$R_3$— and —W, $R_3$ denotes an oxygen or sulphur atom or a grouping

whereby Y and Z stand for hydrogen or an aliphatic, araliphatic or cycloaliphatic substituent which may be part of a heterocyclic ring, and W represents a substituent to be split off as a negative ion.

The invention further relates to the chromium, cobalt and copper complexes of the above defined dyestuffs.

It is an object of this invention to provide novel metal-free and metal-containing azo dyestuffs which belong to the class of the so-called reactive dyestuffs, i.e. dyestuffs which are capable of being fixed onto fibrous materials in particular OH— or amide group containing fibres, by means of chemical linkage; another object is the provision of a dyeing and printing method by which the new dyestuffs are applied and fixed onto the fibrous materials yielding dyeings and prints of outstanding fastness to wet processing. Further object will appear in the following disclosure.

The new disazo dyestuffs are obtained by coupling a disazotised aryl amine first in an acid medium with 1-amino-7-hydroxynaphthalene or a 1-amino-7-hydroxy-naphthalene-sulphonic acid, subsequently combining the resultant monoazo compound in an alkaline medium with a diazotised aryl amine containing in the o-position to the diazo group a group forming a metal complex or convertible into such a group under the conditions of metallisation, and choosing the starting components in such a manner that at least one of the diazo components used contains at least one of the following groupings of the formula $$-SO_2-R_1-W \text{ or } -R_2-R_3-R_4-W$$

In these substituents $R_1$ to $R_4$ and W have the above significance.

The diazo components may contain, in addition to one or more of the aforesaid groupings, substituents usual for azo dyestuff such as halogen, nitro, alkyl, alkoxy, acylamino and free sulphonic acid and carboxylic acid groups.

The new dyestuffs may be converted according to conventional processes in substance or on a substrate into their copper, cobalt and chromium complexes.

The grouping —$R_2$—$R_3$—$R_4$—W may be either linked to the nucleus directly or externally via, for example, ether, sulphonamide or carboxyamide groups in the starting components or in the dyestuff molecule. Under the term radical to be split off as a negative ion (W) there may be understood, for example, ester groupings such as —$OSO_3X$— or

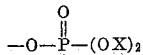

(X being hydrogen or an alkali metal cation), sulphonyloxy groups and halogen substituents such as —Cl and —Br.

Instead of using diazo components with the groupings $$-SO_2-R_1-W \text{ or } -R_2-R_3-R_4-W$$

some of these groupings may be introduced subsequently into the disazo dyestuffs by a modified method of production. For example, sulphonic acid group-containing or carboxylic acid group-containing diazo components may be employed in which the sulphonic acid or carboxylic acid groups are converted following the acid and alkaline coupling into the groupings

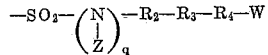

or

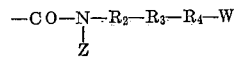

wherein Z represents hydrogen, an araliphatic, cycloaliphatic or aliphatic radical which may be part of a heterocyclic ring, $q$ stands for the number 0 or 1, and $R_2$, $R_3$, $R_4$ and W have the aforesaid significance.

For the transformation into the groupings

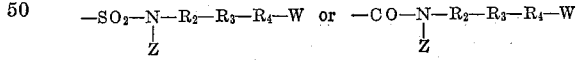

the sulphonic acid or carboxylic acid groups in the dyestuffs are transformed by the action of chlorosulphonic acid and/or thionyl chloride into the corresponding sulphonic acid or carboxylic acid chlorides and the latter condensed, preferably in a weakly alkaline medium, with e.g. the sulphuric acid semi-esters of alkanol amines of the formula

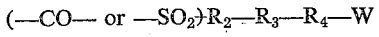

such as N-methyl-N-hydroxyethyl-propylene-diamine-(1,3), or N,N-dihydroxyethyl-propylene-diamine-(1,3). In the case where W represents in the grouping $$(-CO- \text{ or } -SO_2)R_2-R_3-R_4-W$$

a halogen atom, the sulphonic acid chlorides or carboxylic acid chlorides of the dyestuff may be reacted with the necessary ω-halogen compounds such as, for example, N-β-chloroethyl-N-methylpropylene-diamine-(1,3).

The same process may obviously also be used for the introduction of the aforesaid groupings into the diazo components.

For the transformation of sulphonic acid groups contained in the dyestuffs into sulphone groupings of the formulae $$-SO_2-R_1-W \text{ or } -SO_2-R_2-R_3-R_4-W$$

the sulphonic acids are reduced to sulphinic acids or their alkali metal salts which are reacted, for example, with β-chlorethyl alcohol or ethylene oxide or with N-β-chlorethyl-N-β-hydroxyalkyl amines, and the hydroxy groups are subsequently converted into a substituent to be split off as a negative ion, for example by esterification with sulphuric acid into a sulphuric acid semi-ester group.

A further modification of the process consists in transforming sulphonic acid or carboxylic acid groups contained in the diazo components, first into sulphochloride or carboxylic acid chloride groups, these, in turn, into groupings

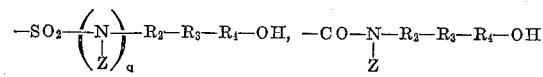

or

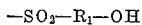

effecting the double-sided coupling with 1-amino-7-hydroxy-naphthalene or an 1-amino-7-hydroxynaphthalene-sulphonic acid and finally converting the aliphatically bound hydroxyl groups in the disazo dyestuffs—before or after metallisation of the dyestuffs in substance—in conventional manner into a substituent to be split off as a negative ion, preferably into an ester or halogen group.

When using sulphonic acid group-free diazo components, the sulphonic acid chloride groups may be introduced after coupling into the disazo dyestuff in such a manner that the dyestuff is treated with a sulphochlorinating agent such as chlorosulphonic acid and thionyl chloride, one or more sulphochloride groups thus being introduced; the latter may then be transformed into the desired groupings. In the sulphochlorination of the disazo dyestuffs, sulphochloride groups may possibly also be introduced into the naphthalene nucleus of the coupling component, which are either saponified or likewise transformed into the groupings

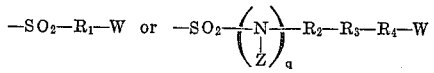

Substituents in which the radical $-R_2-R_3-R_4-W$ is directly linked to the aromatic ring system of the dyestuffs, may be introduced, for example, by reacting the chloromethyl compound of the dyestuff or of the diazo compound with β-hydroxyethyl-methyl amine, and esterifying the end-positioned hydroxyl group either subsequently or after the formation of the dyestuffs with sulphuric acid, phosphoric acid or sulphonyl compounds.

The aforesaid processes yield a great variety of possible linkages of the groupings $$-R_2-R_3-R_4-W \text{ or } -SO_2-R_1-W$$

with the aromatic or heterocyclic ring systems of the dyestuff. Some of these possible linkages are shown in the following:

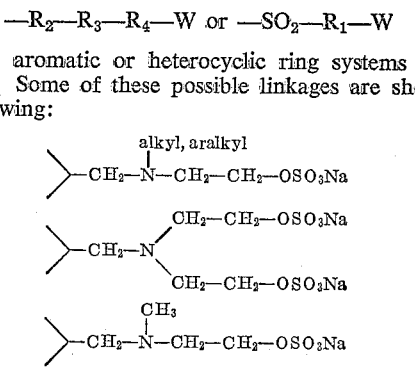

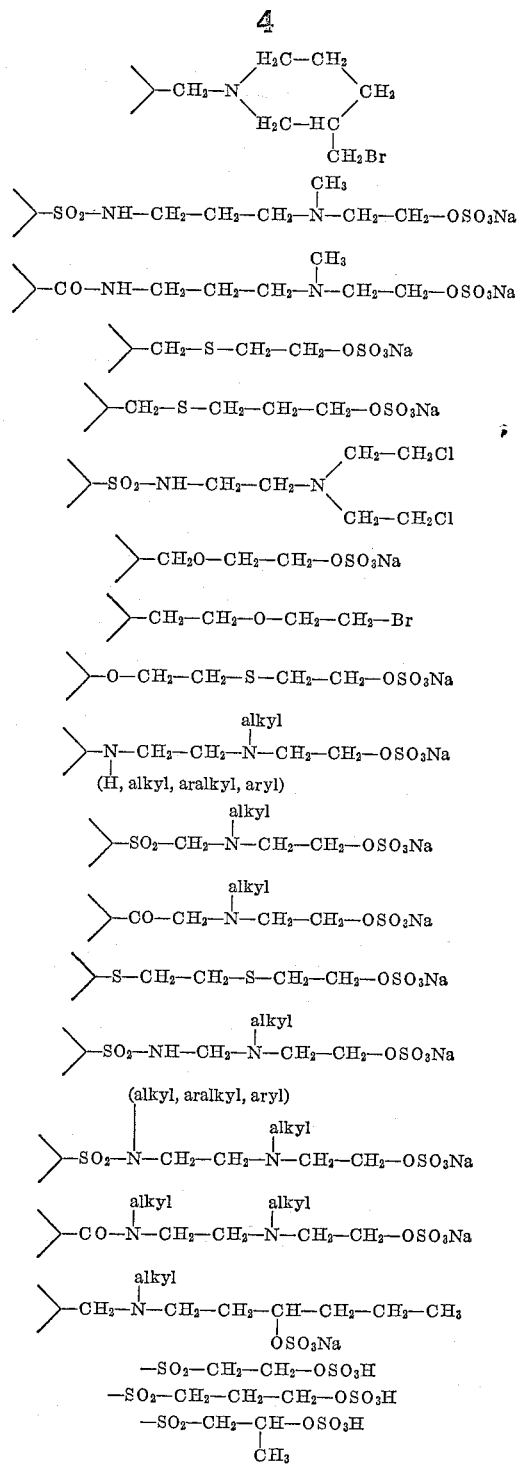

Radicals in which the substituent Y of the grouping

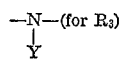

represents an aliphatic substituent which is part of a heterocyclic ring, may be built up in the following manner:

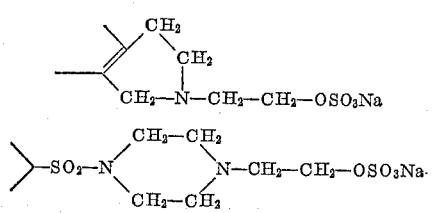

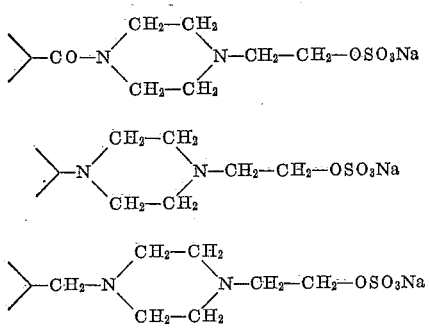

The radicals $R_1$, $R_2$ and $R_4$ can be straight chain as well as branched.

Diazo components suitable for the process are, for example, 1-amino-3-nitro-benzene-4-sulphonic acid, 1-amino-2-nitro-benzene-4-sulphonic acid, 1-amino-2- or -3-chlorobenzene-4-sulphonic acid, 1-amino-2-alkoxy-benzene-5-sulphonic acid, 1-aminobenzene-2, -3- or -4-sulphonic acid, 2-amino-1-hydroxybenzene-4- or -5-sulphonic acid, 2-amino-1-hydroxy-6-chlorobenzene-4-sulphonic acid, 2-amino-1-carboxybenzene-4-sulphonic acid, 1-amino-2-chlorobenzene-4-sulphonic acid, 2-amino-1-hydroxy-4-chlorobenzene-6-sulphonic acid, 2-amino-1-hydroxybenzene-4,6-disulphonic acid, 2-amino-1-hydroxy-4-nitrobenzene-6-sulphonic acid, 2-amino-1-hydroxy-6-nitrobenzene-4-sulphonic acid, further interalia the corresponding β-hydroxyalkyl sulphones, vinyl sulphones, sulphonylethyl-hydrogen sulphates, the sulphonic acid-[3-di-(β-hydroxyethyl)-aminopropyl-amides-(1)], sulphonic acid - [3-(methyl-β-hydroxyethyl)-aminopropyl-amides-(1)], the sulphonic acid-β-chlorethylamides derived from sulphonic acids, as well as the sulphonic acid group-free amines.

If in the diazo component for the alkaline coupling the substituent in the o-position to the amino or diazo group is to be converted into a metal complex-forming group under the conditions of metallisation, it is, in general, advantageous to form the substituent W to be split off as a negative ion only at the end of the process, i.e. in the disazo dyestuffs, since in strongly alkaline conditions of metallisation the splitting off may easily occur prematurely. Examples of diazo components to be used substituted by o-chloro or o-alkoxy groups, which may be coppered according to known processes with an exchange of chlorine or cleavage of the alkoxy group, are inter alia the following diazo compounds: 1-amino-2-alkoxy-4-methylbenzene - 5-β-hydroxethyl sulphone, 1-amino-2-chloro-6-methylbenzene-4-β-hydroxethyl-sulphone, 1-amino-2-chloro- or -methoxybenzene-4- or -5-β-hydroxethyl sulphone, 1-amino-2-alkoxybenzene-5-sulphonic acid-[3-di(β-hydroxyethyl)aminopropyl amide-(1)] or 1-amino-2-chlorobenzene-4-sulphonic acid-[3-(methyl-β-hydroxethyl)-aminopropyl amide-1]

In the case wherein the diazo component for the alkaline coupling the substituent in the o-position to the azo bridge and convertible into a metal complex-forming group, represents a hydrogen atom or a sulphonic acid group, the synthesis of copper complex compounds of o,o'-dihydroxyazo dyestuffs may be performed according to the processes disclosed in German patent specifications Nos. 807,289, 889,196, 893,699 or 1,006,098. Since in this case the processes are carried out under milder reaction conditions, the oxidizing coppering may also be effected if the diazo component contains from the beginning one of the groupings $$—SO_2—R_1—W \text{ or } —R_2—R_3—R_4—W$$

In the case of subsequent esterification of aliphatic hydroxyl groups for the purpose of forming the groupings —O—ester (for W) or of a subsequent reaction of sulphonic or carboxylic acid chloride groups to give the groupings

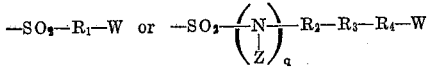

or

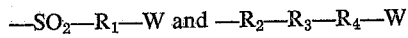

the sulphonic acids or carboxylic acids on which the aforementioned diazo components are based, or the hydroxyalkyl compounds may be used.

In addition to the groupings $$—SO_2—R_1—W \text{ and } —R_2—R_3—R_4—W$$

the diazo components or their radicals in the final dyestuffs may also contain free sulphonic acid or carboxylic acid groups. Free carboxylic acid groups, provided they are in the o-position to the amino group in the diazo component to be used for the alkaline coupling, may be included in the metal complex combination in the subsequent metallisation of the dyestuffs. Suitable diazo components with free sulphonic acid or carboxylic acid groups are inter alia: 1-amino-2-nitrobenzene-4-sulphonic acid, 1-amino-2-methylbenzene-4-carboxylic acid, 1-amino - 2-chlorobenzene-4-sulphonic acid, 1-amino-2,5-dimethylbenzene-4-sulphonic acid, 1-amino-2-methoxybenzene-4-sulphonic acid, 1-amino-2-hydroxybenzene-4- or -5-sulphonic acid or 1-amino-2-carboxy-benzene-4-sulphonic acid.

If the free sulphonic acid or carboxylic acid groups are to be retained in the final dyestuffs, that is to say that they are not to be converted into the desired end groupings via the acid chlorides according to one of the aforesaid processes, it is advantageous to employ one of the two diazo components with one or more free sulphonic acid or carboxylic acid groups and the other diazo component with one or more groupings of the above formulae.

The new dyestuffs may be used in the metal-free form or as copper, cobalt or chromium compounds, especially for the dyeing hydroxyl group-containing materials such as cotton or regenerated cellulose. The dyestuffs are preferably fixed at elevated temperature in the presence of an acid-binding agent. Processes of this kind are known from the recent literature. Thus, the dyestuffs are used for the dyeing preferably from an aqueous solution adding alkaline compounds such as alkali metal hydroxide or alkali metal carbonate, or compounds substances yielding alkaline compounds such as alkali metal bicarbonate. Further assistance may be added to the solution provided they do not react with the dyestuffs in an undesirable manner. Examples of such additives are surface-active substances such as alkyl sulphates and compounds or dyeing auxiliaries preventing migration of the dyestuff such as urea (to improve solubility and fixation of the dyestuffs), or inert thickening agents such as oil-in-water emulsions, tragacanth, starch, alginate or methyl cellulose.

The solution or pastes thus obtained are applied to the material to be dyed, for example by padding in the foulard or by printing, and subsequently heating it to an elevated temperature, preferably to 40–160° C. Heating may be effected in the hot flue, steaming apparatus, on heated rollers or by introducing the material into hot concentrated salt baths alone or consecutively in any desired sequence.

When a padding or dyeing liquor is used in the absence of alkali, there follows a passage of the dry material through an alkaline solution to which common salt or Glauber's salt is added. The salt addition decreases the migration of the dyestuff from the fibre.

The material to be dyed may also be pre-treated with one of the aforesaid acid-binding agents, subsequently treated with a solution or paste of the dyestuff, and finally fixed, as indicated above, at an elevated temperature.

When fixation is completed, the dyeing material is rinsed in hot water and, in cases where it is necessary for the desired final purpose of the dyeing material, subsequently soaped, thus removing residual insufficiently fixed dyestuff. Dyeings of excellent wet fastness are obtained through the dyestuffs preferably to be used have only a slight or no affinity to the material to be dyed.

For printing materials containing hydroxyl groups a printing paste is used consisting of the dyestuff solution, a thickening agent such as sodium alginate, and an alkaline compound or a compound splitting off alkali upon heating such as sodium carbonate, potassium carbonate or sodium bicarbonate, and the printed material is then rinsed and finally soaped, if desired.

Materials containing amide groups such as wool, silk and the like, may also be dyed or printed according to known processes.

Among the fastness properties attained, the outstanding fastness to wet treatment on cellulose-containing materials and the very good fastness to light as well as the good resistance of the dyeings or prints to dry cleaning may especially be mentioned.

The following examples are given for the purpose of illustrating the invention.

*Example 1*

(a) 2 mol of the ammonium salt of 1-amino-2-nitrobenzene-4-sulphonic acid are suspended in 5 litres of water and 152 g. of sodium nitrite and allowed to run with ice-cooling into 460 ml. of concentrated HCl in 4 litres of water. When the diazotisation is completed, amidosulphonic acid is added until no nitrite reaction occurs any longer, and the suspension of the barely soluble diazo compound is added dropwise to a hydrochloric acid solution of 2 mol of 1-amino-7-hydroxynaphthalene in 3 litres of water. The red-brown monoazo dyestuff thereby precipitates as chlorohydrate. It is filtered off with suction, washed with dilute hydrochloric acid and the residue dissolved in 10 litres of aqueous sodium hydroxide. 2 mol of diazotised 4-chloro-2-amino-1-hydroxybenzene-6-sulphonic acid are then added with ice cooling and the mixture is kept alkaline by the addition of a dilute sodium hydroxide solution. After completion of the coupling, the black disazo dyestuff is salted out with sodium chloride and filtered off with suction. The dyestuff may be purified by dissolution in water, heating to 80–90° C. and renewed salting out.

The operation may also be carried out by dissolving the monoazo dyestuff in a sodium hydroxide solution without isolating it and then performing the alkaline coupling in the same solution.

142 g. of the disazo dyestuff (0.2 mol) thus obtained are introduced with cooling into 600 ml. of chlorosulphonic acid and the solution is heated to 80° C. for two hours. The reaction mixture is cooled to 60° C. and then treated dropwise with 80 ml. of thionyl chloride. The reaction mixture is stirred at 60° C. for a further two hours, cooled and then poured onto ice. The sulphochloride of the disazo dyestuff precipitates in crystalline form. After suction-filtration it is washed with ice water until neutral to Congo, and the mixture is divided.

(b) 0.1 mol of the moist sulphochloride of the disazo dyestuff is introduced with ice cooling into 1300 ml. of a 10% aqueous solution of N,N-dihydroxyethyl-propylene-diamine-(1,3). The mixture is further stirred at room temperature for a few hours, then heated to 60° C., salted out, and the reaction product filtered off with suction. The dry disazo dyestuff is then introduced at 15–22° C. into 3 parts by volume of sulphuric acid monohydrate. The esterified dyestuff is poured on ice after two hours, the crystalline product filtered off with suction and washed with a potassium chloride solution to remove the mineral acid, the residue is neutralised with a dilute sodium hydroxide solution and dried at 50° C. in a vacuum.

(c) 0.1 mol of the moist sulphochloride of the disazo dyestuff obtained according to (a) is introduced with ice cooling into 1060 ml. of a 10% solution of N-methyl-N-hydroxyethyl-propylene-diamine-(1,3). Further processing is effected as described under (b).

(d) 0.8 g. of the disazo dyestuff ester obtained according to Example 1 (b) or (c) are dissolved in 10 ml. of an aqueous solution containing per litre 34 ml. of a concentrated sodium hydroxide solution, 100 g. of urea and 5 g. of Turkey red oil, and applied to cotton or regenerated cellulose. After squeezing, the material is dried at 100–140° C. for a few minutes, treated at 50–60° C. with an acetic acid copper sulphate solution and then soaped at the boil. A black dyeing is obtained of very good fastness to wet processing and good general fastness properties.

In the place of a sodium hydroxide solution, other acid-binding agents such as potassium lye, sodium carbonate, potassium carbonate, sodium acetate, sodium bicarbonate, potassium bicarbonate and secondary or tertiary sodium phosphate may also be used.

When in the following table the starting components given under (a) are used, there are likewise obtained according to the methods indicated under (b) and (c) respectively valuable disazo dyestuffs yielding on cotton, for example by the dyeing method (d), dyeings in the shades indicated of very good fastness to wet processing.

| 1st diazo component (acid coupling) | Coupling component | 2nd diazo component (alkaline coupling) | Shade of the dyeing coppered on the fibre |
|---|---|---|---|
| 1-amino-2-nitrobenzene-4-sulphonic acid. | 1-amino-7-hydroxynaphthalene. | 6-chloro-2-amino-1-hydroxybenzene-4-sulphonic acid. | black. |
| Do | do | 6-nitro-2-amino-1-hydroxybenzene-4-sulphonic acid. | Do. |
| Do | do | 2-amino-1-hydroxybenzene-4-sulphonic acid. | Do. |
| Do | do | 2-amino-1-hydroxybenzene-4,6-disulphonic acid. | Do. |
| 1-amino-3-nitrobenzene. | do | do | Do. |
| 1-amino-4-nitrobenzene. | do | do | Do. |

*Example 2*

0.4 mol of 1-amino-2-nitrobenzene-4-sulphonic acid-[3-di-(β-hydroxethyl)-aminopropylamide-(1)] are stirred in 1200 ml. of water and 306 ml. of a 10% sodium nitrite solution and allowed to run at 0–5° C. into 92 ml. of concentrated hydrochloric acid in 1200 ml. of water. The diazonium salt completely dissolves. The diazonium salt solution is added dropwise to an ice-cold solution of 0.4 mol of 1-amino-7-hydroxynaphthalene in 1000 ml. of water and 32 ml. of concentrated hydrochloric acid. The monoazo dyestuff thereby separates as a red-brown precipitate. The reaction solution is then made soda-alkaline so that the dyestuff redissolved, or, alternatively, the insoluble dyestuff is filtered off with suction, washed with dilute hydrochloric acid and the residue dissolved in an aqueous sodium hydroxide solution. 0.4 mol of diazotised 6 - chloro-2-amino-1-hydroxybenzene-4-sulphonic acid-[3-di-(β-hydroxyethyl)-aminopropylamide-(1)] are added to the alkaline solution of the monoazo compound at a pH value of 10–12. When the coupling is completed, the resultant black disazo dyestuff is salted out with KCl and converted into the sulphuric acid semi-ester with sulphuric acid or chlorosulphuric acid/pyridine.

When applied to cotton or cellulose in the manner described in Example 1(d) and by an aftertreatment with copper sulphate/acetic acid a black dyeing of good fastness properties is obtained.

Example 3

The metal-free disazo obtained according to Example 2 is suspended in water, acidified with acetic acid and treated with a solution of 200 g. of crystalline copper sulphate, 100 ml. of acetic acid and 3 litres of water. The mixture is heated to 65–70° C. for one hour, rendered alkaline with sodium carbonate, the separated copper carbonate filtered off with suction and the copper-containing dyestuff salted out with sodium chloride. After drying in a vacuum, a black powder is obtained which may be fixed on cotton or regenerated cellulose according to the dyeing method described in Example 1(d). A wet-fast, black dyeing is obtained.

For printing, the dyestuff is stirred into a customary alginate or oil emulsion thickening and printed on cotton according to known processes. Upon drying of the fibre material, the black print may be fixed fast to washing by heating in the presence of an acid-binding agent.

When in the processes described in Examples 2 and 3 the starting components given below are used, wet-fast dyeings or prints on cotton and regenerated cellulose are likewise obtained in the shades indicated below upon fixation with acid-binding agents at elevated temperature.

| 1st Diazo component (acid coupling) | Coupling component | 2nd Diazo component (alkaline coupling) | Shade of the dyestuffs coppered in substance or on the fibre |
|---|---|---|---|
| 1-amino-2-nitrobenzene-4-sulphonic acid-[3-di-($\beta$-hydroxethyl)-amino-propylamide-(1)]. | 1-amino-7-hydroxy-naphthalene. | 4-chloro-2-amino-1-hydroxybenzene-6-sulphonic acid-[3-di-($\beta$-hydroxethyl)-aminopropylamide-(1)]. | black. |
| 1-amino-2-nitrobenzene-4-sulphonic acid-[3-(methyl-$\beta$-hydroxethyl)-aminopropylamide-(1)]. | ___do___ | 2-amino-1-hydroxybenzene-4,6-di-sulphonic acid-[3-methyl-$\beta$-hydroxethyl)-aminopropylamide-(1)]. | Do. |
| 1-amino-3-nitrobenzene-4-sulphonic acid-[3-di-($\beta$-hydroxethyl)-aminopropylamide-(1)]. | ___do___ | 6-chloro-2-amino-1-hydroxybenzene-4-sulphonic acid-[3-di-($\beta$-hydroxethyl)-aminopropylamide-(1)]. | Do. |
| 1-amino-3-nitrobenzene-4-sulphonic acid-[3-(methyl-$\beta$-hydroxethyl)-amino-propylamide-(1)]. | ___do___ | 4-chloro-2-amino-1-hydroxybenzene-6-sulphonic acid-[3-methyl-$\beta$-hydroxethyl)-aminopropylamide-(1)]. | Do. |
| 1-amino-2-nitrobenzene-4-sulphonic acid-[3-di-($\beta$-hydroxethyl)-amino-propylamide-(1)]. | ___do___ | 2-amino-1-hydroxybenzene-4-sulphonic acid-[3-di-($\beta$-hydroxethyl)-amino-propylamide-(1)]. | Do. |

Example 4

1 mol of the disazo dyestuff 1-amino-2-nitrobenzene→1-amino-7-hydroxynaphthalene←2-amino-1-hydroxybenzene is converted into the sulphochloride of the disazo dyestuff at 100° C. with chlorosulphonic acid and thionyl chloride according to the process described in Example 1(a). The reaction solution is poured onto ice, filtered off with suction, washed with water until neutral to Congo and the filter residue is then introduced into an ice-cooled solution of 1300 g. of N,N-dihydroxyethyl-propylene-diamine-(1,3) in 10 litres of water. The reaction mixture is heated to 60° C., subsequently salted out and filtered off with suction.

The moist filter cake is redissolved in water, rendered alkaline with a sodium hydroxide solution and treated with a solution the sodium-potassium salt of chromosalicylic acid, corresponding to 26 g. of chromium. The mixture is heated to 100° C. for three hours, the black, chromium-containing dyestuff obtained is salted out and filtered off with suction. The dyestuff may be converted into the corresponding sulphuric acid semi-ester with chlorosulphuric acid and pyridine according to known processes.

The chromium-containing dyestuff may be applied by printing on native fibres such as wool and silk, in conventional manner from an acetic acid or formic acid bath with the addition of sodium sulphate or by stirring in a customary thickening. Grey-black dyeings or prints of good fastness to wet processing are obtained.

Example 5

0.25 mol of diazotised 1-amino-2-nitrobenzene-4-$\beta$-hydroxyethyl-sulphone are coupled with 0.25 mol of 1-amino-7-hydroxynaphthalene-3-sulphonic acid in a medium which is acid to Congo. The mixture is rendered alkaline with a sodium hydroxide solution and treated with 0.25 mol of diazotised 6-chloro-2-amino-1-hydroxybenzene-4-$\beta$-hydroxyethyl-sulphone. Isolation of the black dyestuff and subsequent esterification are carried out in conventional manner.

When in this example the diazo components listed in the table of Example 3 are used, black disazo dyestuffs are likewise obtained yielding fast dyeings when fixed on cellulose materials in the presence of acid-binding agents.

Example 6

0.1 mol of a metal-free disazo dyestuff sulphonic acid-[3-di-($\beta$-hydroxethyl)-aminopropylamide-(1)] or -[3-(methyl-$\beta$-hydroxyethyl)-aminopropyl-amide-(1)] obtained according to Example 4 is heated to 90° C. in 2 litres of an aqueous sodium hydroxide solution. A solution of 15 parts by weight of crystalline cobalt sulphate in 250 ml. of water is added which was rapidly poured with vigorous stirring into 150 parts by volume of a 25% ammonia solution and subsequently treated with 5 parts by volume of 30% hydrogen peroxide. Cobaltation is completed instantaneously. The product is salted out and the metal complex filtered off with suction.

Esterification of the dyestuff and the dyeing on cotton or other native fibres may be carried out according to the processes desecribed above.

Example 7

0.2 mol of diazotised 2-amino-1-carboxybenzene-4-sulphonic acid - [3 - (methyl-$\beta$-hydroxyethyl)-aminopropyl-amide-(1)] are added at a pH value of 10–12 to 0.2 mol of the monoazo dyestuff obtained from diazotised 1-amino-2-nitrobenzene-4-sulphonic acid-[3-di-($\beta$-hydroxyethyl)-aminopropylamide-(1)] by acid coupling with 1-amino-7-hydroxynaphthalene. After completion of the coupling, the black disazo dyestuff is salted out and esterified with chlorosulphonic acid and pyridine.

50 g. of the disazo dyestuff thus obtained are dissolved in 500 ml. of water and introduced into an ammoniacal copper sulphate solution. The mixture is heated to 60° C. for one hour, and the copper-containing dyestuff is salted out.

Example 8

0.3 mol of the red-brown monoazo dyestuff from diazotised 1-amino-2-nitrobenzene-4-sulphonic acid and 1-amino-7-hydroxynaphthalene are treated in a sodium hydroxide solution with 0.3 mol of diazotised 2-amino-1-hydroxybenzene-4,6-bis-(sulphonic acid-[3-di-($\beta$-hydroxyethyl)-aminopropylamide-(1)]. After completion of the coupling, the product is rendered acetic acid, and the black disazo dyestuff is salted out with potassium chloride.

Example 9

0.2 mol of diazotised 2-amino-1-hydroxybenzene-4,6-bis-(sulphonic acid-$\beta$-chlorethyl amide) are added in a sodium hydroxide solution to 0.2 mol of the red-brown monoazo dyestuff from diazotised 1-amino-2-nitrobenzene-4-sulphonic acid and 1-amino-7-hydroxynaphthalene-3-sulphonic acid. The resultant disazo dyestuff may be applied from an alkaline medium to vegetable fibres and fixed fast to washing by heat treatment.

Example 10

(a) 2 mols of 2-amino-1-methoxybenzene-4-sulfonic acid are diazotised in 4000 ml. of ice water and 250 ml. of concentrated hydrochloric acid with 138 g. of sodium nitrite. The clear almost colorless diazonium salt solution is run into a hydrochloric acid solution and 322 g. of 1-amino-7-hydroxynaphthalene in 16 l. of ice water. The solution is then adjusted to pH 4 by addition of 500 g. of cryst. sodium acetate. An initially violet colored effluent on test paper becomes thereby colorless. As soon as the diazo component and the coupling component are no longer detectable, a pH of 11 is adjusted by means of 400 ml. of concentrated sodium hydroxide solution. The violet monoazo dyestuff thereby dissolves with a red-brown coloration. 2 mols of 6-chloro-2-aminophenol-4-sulfonic acid are diazotised with 152 g. of sodium nitrite in 4000 ml. of ice water and 250 ml. of concentrated hydrochloric acid within a few minutes and the yellow clear solution is added dropwise to the monoazo dyestuff kept at 0 to 5° C. The pH value is maintained at 9.2 to 10 by the simultaneous addition of about 225 ml. of concentrated sodium hydroxide solution. The solution is stirred until monoazo dyestuff can no longer be detected chromatographically, then adjusted to pH 8.5 by adding dilute hydrochloric acid and the black diazo dyestuff is salted out with 3.2 kg. of sodium chloride. After filtering off with suction the dyestuff is dried at 60° C.

(b) When replacing in Example 10(a) 6-chloro-2-aminophenol-4-sulfonic acid, by 4-chloro-2-aminophenol-6-sulfonic acid, 2-aminophenol-4-sulfonic acid, 2-aminophenol-5-sulfonic acid, 2-anisidine-4-sulfonic acid, 2-chloro-aniline-5-sulfonic acid or 3-aminobenzene-1-sulfonic acid, black colored diazo dyestuffs are likewise obtained.

Example 11

(a) 72.5 g. of a disazo dyestuff prepared according to Example 10 are heated in 175 ml. of chlorosulfonic acid at 25 to 30° C. for 2 hours. 75 ml. of thionylchloride are added to the solution which is stirred at room temperature for another 3 hours. The melt is then poured onto ice, filtered off, the residue is washed congo neutral with ice water and the dyestuff sulfochloride is introduced while cooling with ice into 960 ml. of a 10 percent aqueous solution of N,N-dihydroxyethyl-propylenediamine-(1,3). The solution is stirred at room temperature for some hours; then heated to 60° C., the reaction product is separated by salting out and is filtered off with suction. The dry disazo dyestuff is introduced at 15 to 22° C. into 3 parts by volume of sulfuric acid monohydrate. After 2 to 3 hours the esterified dyestuff is cast onto ice, filtered off with suction, washed with potassium chloride solution and the residue is adjusted to pH 5 with dilute sodium hydroxide solution.

If, instead of N,N-dihydroxyethyl-propylenediamine-(1,3), the following amines are used, black reactive dyestuffs are likewise obtained:

$$H_2NC_3H_6N-C_2H_4OH$$
$$\quad\quad\quad|$$
$$\quad\quad\quad CH_3$$

$$H_2NC_2H_4N-C_2H_4OH$$
$$\quad\quad\quad|$$
$$\quad\quad\quad CH_3$$

$$H_2NC_2H_4NHC_2H_4OH$$

mixture of

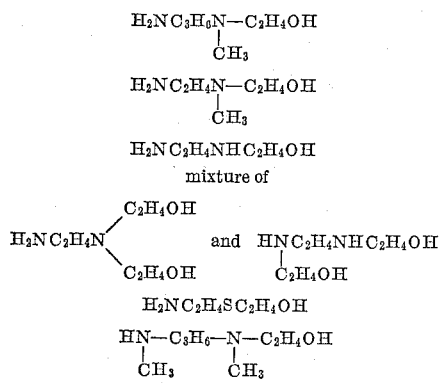

$$H_2NC_2H_4SC_2H_4OH$$

$$HN-C_3H_6-N-C_2H_4OH$$
$$\;|\quad\quad\quad\;\;|$$
$$CH_3\quad\quad CH_3$$

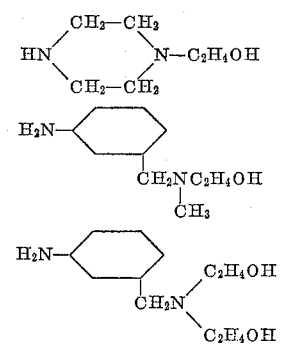

(b) A dyestuff ester prepared according to the method described in Example 11(a) is dissolved in 800 ml. of water; 10 ml. of acetic acid, 27 g. of cryst. sodium acetate and 14 g. of cryst. cobalt sulfate in 140 ml. of water are added to the solution which is heated to 50° C. for one hour. The pH value is adjusted to 5.8 by means of dilute sodium hydroxide solution, potassium chloride is added and the 1:2-cobalt complex dyestuff is filtered off with suction. The dyestuff can be applied onto cotton and staple rayon by the method described in Example 1(d). Deep black dyeings with very good fastness to light and washing are thus obtained.

(c) When using in the method described in Example 11(b) instead of cobalt sulfate, equivalent amounts of copper or nickel sulfate, black dyestuffs which are fast to light are likewise obtained.

(d) By subjecting the disazo dyestuffs obtainable according to Example 10(b) to sulfochlorination as described in Example 11(a), similar brown black and black dyestuffs are obtained which give on cotton dyeings with very good fastness to boiling.

The sulfochlorinated dyestuff can be applied in a solution according to Example 1(d) on materials containing hydroxyl groups such as cotton and regenerated celluose, and can be metallised on the fibre with cobalt, nickel or copper salts or converted in substance into metal complexes either according to Example 11(b), Example 11(c) or other customary methods. When using a disazo dyestuff obtained by acid coupling of diazotised 2-anisidine-4-sulfonic acid with 1-amino-7-hydroxynaphthalene and subsequent alkaline coupling with diazotised 3-aminobenzene-1-sulfonic acid, a corresponding copper complex can for instance be produced by coppering with oxidation with copper sulfate, acetic acid and $H_2O_2$. By decoppering with sulfuric acid or sodium sulfide an o,o'-dihydroxy-disazo dyestuff is obtained which can be converted into other metal complexes in known manner.

Example 12

72.5 g. of a disazo dyestuff prepared according to Example 10 are sulfochlorinated according to Example 11 and condensed at pH 9 to 9.5 with an aqueous solution of 6 mol equivalents of a sulfuric acid semi ester of N-methyl-N-hydroxyethyl-propylenediamine-(1,3). As soon as the pH value of the reaction solution remains constant, the reaction product is salted out and filtered off with suction.

The black dyestuff ester can be fixed on cotton according to Example 1(d) and treated with metal salts or metallised in substance according to Example 11(b) or 11(c).

Example 13

(a) 1.45 mols of 2-amino-1-methoxybenzene-4-sulfonic acid-[3-(N-methyl-N-β-hydroxyethyl)-aminopropylamide-(1)]-sulfuric acid semi ester are dissolved in 2.9 l. of water 2.9 kg. of ice are added to the solution which is then diazotised with 0.37 l. of crude hydrochloric acid (=0.29 l. of concentrated HCl) and 0.333 l. of sodium nitrite solution (30%) at 0 to 5° C. The volume of the resulting solution is about 7 l. An excess of nitrite is removed with amidosulfonic acid. Into the diazonium salt solution thus prepared there is run an acid to congo salt solution of 1.45 mols of 1-amino-7-hydroxynaphthalene (=0.2355 kg. 100%) in 2.25 l. of water, 2.25 kg. of ice and 0.19 l. of crude hydrochloric acid (0,15 l. of concentrated HCl).

The violet monoazo dyestuff precipitates immediately. The temperature is maintained at 0 to 5° C. by the addition of at most 5 kg. of ice. The total volume of the solution is 17.5 l. (maximum). By applying the dyestuff to test paper by the spot method an initially non-colored effluent assumes immediately a violet coloration as long as the coupling is not yet complete. The solution is stirred for some hours until the effluent has become colorless and the solution is then tested for diazo compound and coupling component. After coupling is complete the solution is filtered off with suction. 2.8 kg. of moist monoazo dyestuff are mixed with stirring in 4.0 l. of water and 0.65 l. of ammonia (25%) and cooled with 3.0 to 4.0 kg. of ice. At a temperature of 0 to 5° C. there are added a diazonium salt solution from 1.5 mols of 6-chloro-2-aminophenol-4-sulfonic acid-[3-(N-methyl-N-$\beta$-hydroxyethyl)-aminopropylamide-(1)]-sulfuric acid semi ester, 5.5 kg. of ice, 0.47 l. of crude hydrochloric acid and 0.341 l. of 30 percent sodium nitrite solution (volume 12.5 l.). The pH value is kept between 9.5 to 10.3 by adding ammonia (25%). The solution is filtered off with suction and the reaction product is dissolved in 8.0 l. of water at 40° C., acidified with 0.15 l. of glacial acetic acid; the solution is adjusted to pH 5 with 0.232 kg. of sodium acetate calc. (=0.39 kg. of cryst. sodium acetate) and a solution of 0.2 kg. of cryst. cobalt sulfate (7H$_2$O) in 600 to 1200 ml. of water is added. The solution is stirred at 50° C. for one hour, the reaction solution adjusted to pH 5 to 6 with about 0.7 l. of a soda solution, the dyestuff is salted out and filtered off with suction. After drying in vacuum at 50° C. a dyestuff is obtained which can be fixed on cotton from an alkaline solution. The deep black dyeings show very good fastness to light, boiling and solvents.

(b) When using in Example 13(a) instead of cobalt sulfate, copper or nickel salts, black dyestuffs with good fastness properties are likewise obtained.

(c) When using in Example 13(a) instead of 6-chloro-2-aminophenol-4-sulfonic acid-[3-(N-methyl-N-$\beta$-hydroxyethyl)-aminopropylamide-(1)]-sulfuric acid semi ester, 4-chloro-2-aminophenol-6-sulfonic acid-[3-(N-methyl-N-$\beta$-hydroxyethyl)-aminopropylamide-(1)]-sulfuric acid semi ester or 2-aminophenol-4- or 2-aminophenol-5-sulfonic acid-[3-(N-methyl-N-$\beta$-hydroxyethyl)-aminopropylamide-(1)]-sulfuric acid semi ester, black reactive dyestuffs are likewise obtained.

(d) When using in Example 13a instead of the sulfonic acid-[3-(N-methyl-N-$\beta$-hydroxyethyl)-aminopropylamide-(1)]-sulfuric acid semi ester, the corresponding diazotised sulfonic acid-[3-(N-methyl-N-$\beta$-hydroxyethyl)-aminopropylamide-(1)] a corresponding disazo dyestuff-bis-sulfonic acid-[3-(N-methyl-N-$\beta$-hydroxyethyl)-aminopropylamide-(1)] is obtained which can be converted into the dyestuff ester with sulfuric acid monohydrate or chlorosulfonic acid and pyridine.

Example 14

$\frac{1}{7}$ mol of a disazo dyestuff-bis-sulfonic acid-[3-(N-methyl-N-$\beta$-hydroxyethyl)-aminopropylamide-(1)] obtainable according to Example 13(d) is dissolved in 1300 ml. of a sodium hydroxide solution and mixed at 80° C. with a solution of 20.4 g. of cryst. cobalt sulfate (7H$_2$O) in 360 ml. of water and 254 ml. of ammonia (25%) which was oxidised with 40 ml. of hydrogen peroxide (3.5%). The solution is stirred at 80° C. for another hour and the 1:2-cobalt complex dyestuff is salted out. The dyestuff can be esterified after drying with chlorosulfonic acid and pyridine.

Example 15

$\frac{1}{7}$ mol of a disazo dyestuff-bis-sulfonic acid-[3-(N-methyl-N-$\beta$-hydroxyethyl)aminopropylamide-(1)] obtainable according to Example 13(d) is dissolved in 2000 ml. of water and 20 ml. of concentrated NaOH at 90 to 95° C. and mixed within 30 minutes with a solution of 11.6 g. of potassium bichromate and 22.5 g. of glucose in 225 ml. of water. The solution is stirred for another 40 minutes, rendered acetic acid and the 1:2-chromium complex dyestuff is filtered off with suction. After drying the dyestuff can be converted with chlorosulfonic acid and pyridine into a dyestuff ester which can be applied to cotton in a quantitative yield.

Example 16

When using in the Examples 14 and 15 disazo dyestuffs prepared by the method of Example 13(d) with the diazo components described in Example 13(c), valuable black reactive dyestuffs are likewise obtained.

Example 17

$\frac{1}{7}$ mol of a disazo dyestuff-bis-sulfonic acid-[3-(N-methyl-N-$\beta$-hydroxyethyl)-aminopropylamide-(1)] obtainable according to Example 13(d) is heated to 135° C. for 20 hours in 200 ml. of ethylene glycol with 41 g. of cryst. chromium trichloride. The solution is then allowed to cool, poured into water and the 1:1-chromium complex is salted out. The 1:1-chromium complex can be esterified in known manner.

Example 18

When using in Example 13(a) the following diazo and coupling components, reactive dyestuffs or initial products thereof are likewise obtained:

| (1) diazo component (acid coupling) | coupling component | (2) diazo component (alkaline coupling) |
|---|---|---|
| 2-amino-1-methoxy-benzene-4-sulfonic acid-[3-(methyl-$\beta$-hydroxyethyl)-aminopropylamide-(1)]. | 1-amino-7-hydroxy-naphthalene. | 2-amino-1-methoxy-benzene-4-sulfonic acid-[3-(methyl-$\beta$-hydroxyethyl)-aminopropylamide-(1)]. |
| 2-amino-1-methoxy-benzene-4-sulfonic acid-[3-(methyl-$\beta$-hydroxyethyl)-aminopropylamide-(1)]-sulfuric acid semi ester. | do | 2-amino-1-methoxy-benzene-4-sulfonic acid-[3-(methyl-$\beta$-hydroxyethyl)-aminopropylamide-(1)]-sulfuric acid semi ester. |
| 1-amino-2-nitro-benzene-4-sulfonic acid-[3-(methyl-$\beta$-hydroxyethyl)-aminopropylamide-(1)]-sulfuric acid semi ester. | do | Do. |
| 1-amino-3-nitro-benzene-4-sulfonic acid-[3-(methyl-$\beta$-hydroxyethyl)-aminopropylamide-(1)]-sulfuric acid semi ester. | do | Do. |
| 1-amino-2-nitro-benzene-4-sulfonic acid-[3-(methyl-$\beta$-hydroxyethyl)-aminopropylamide-(1)]. | do | 2-amino-1-methoxy-benzene-4-sulfonic acid-[3-(methyl-$\beta$-hydroxyethyl)-aminopropylamide-(1)]. |
| 2-amino-1-methoxy-benzene-4-sulfonic acid-[3-di-($\beta$-hydroxy-ethyl)-aminopropyl-amide-(1)]. | do | 6-chloro-2-amino-phenol-4-sulfonic acid-[3-di-($\beta$-hydroxyethyl)-aminopropylamide-(1)]. |
| Do | do | 4-chloro-2-amino-phenol-6-sulfonic acid-[3-di-($\beta$-hydroxyethyl)-aminopropylamide-(1)]. |
| Do | do | 2-aminophenol-4- or 5-sulfonic acid-[3-di-($\beta$-hydroxyethyl)-aminopropylamide-(1)]. |
| 2-amino-1-methoxy-benzene-4-sulfonic acid-[3-(methyl-$\beta$-hydroxyethyl)-aminopropylamide-(1)]. | do | 1-amino-2-chloro-benzene-4-sulfonic acid-[3-(methyl-$\beta$-hydroxyethyl)-aminopropylamide-(1)]. |

The products obtained with the above listed components can be used or worked up by the methods described in the preceding examples or by known methods.

Example 19

80 g. of a reactive dyestuff obtainable according to Example 13(a) and 100 g. of urea are dissolved in 320 ml. of water and 40 g. of NaOH (38° Bé.), mixed while stirring with 440 g. of a usual alginate thickening and printed on cotton by conventional methods. After drying the goods are steamed at 103° C. or fixed at 120 to 140° C. and subsequently saponified at boiling temperature. Black prints with very good fastness to light, boiling and solvents are obtained.

We claim:

1. A metal complex compound selected from the group consisting of a chromium, cobalt and copper complex of a disazo dyestuff which in the free acid state corresponds to the formula

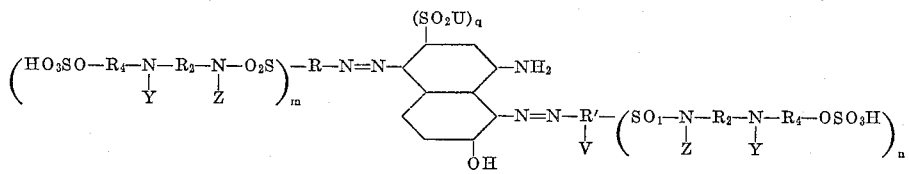

wherein R and R' represent residues of the benzene series, V stands for a substituent capable of forming a metal complex, R' containing V in o-position to the azo bridge, $R_2$ stands for a lower alkylene radical, $R_4$ stands for a lower alkylene radical selected from the group consisting of a straight chain lower alkylene and a branched chain lower alkylene having 2 carbon atoms in straight chain linkage between

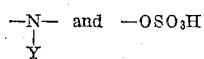

U means a radical selected from the group consisting of OH and

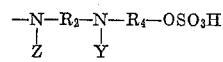

Y stands for a member selected from the group consisting of hydrogen, lower alkyl and $-R_4-OSO_3H$, Z stands for a member selected from the class consisting of hydrogen and lower alkyl, $n$ and $m$ stand for integers within the range of from 0 to 2, $m+n$ being at least 1 and not more than 4 and $q$ is an integer within the range of 0 to 1.

2. A copper complex of a disazo dyestuff which in the free acid state corresponds to the formula

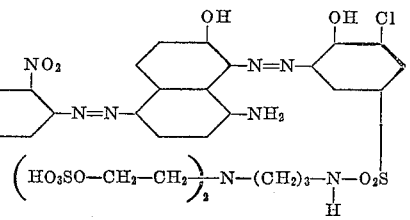

References Cited in the file of this patent

UNITED STATES PATENTS

| | | |
|---|---|---|
| 2,092,143 | Schweitzer | Sept. 7, 1937 |
| 2,128,256 | Krzikalla et al. | Aug. 30, 1938 |
| 2,134,728 | Morschel et al. | Nov. 1, 1938 |
| 2,497,246 | Von Glhn | Feb. 14, 1950 |
| 2,657,205 | Heyna et al. | Oct. 27, 1953 |
| 2,816,102 | Riat et al. | Dec. 10, 1957 |

FOREIGN PATENTS

| | | |
|---|---|---|
| 296,340 | Switzerland | Apr. 17, 1954 |